Sept. 27, 1949. J. R. EVANS 2,483,190
FLOW METER
Filed Aug. 6, 1945 2 Sheets-Sheet 1

INVENTOR
J. R. Evans
BY E. N. Fetherstonhaugh
ATTORNEY

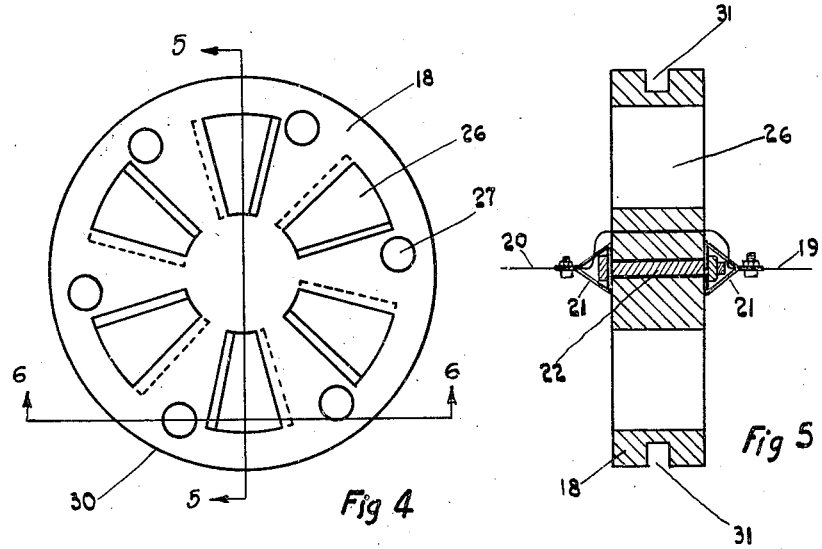
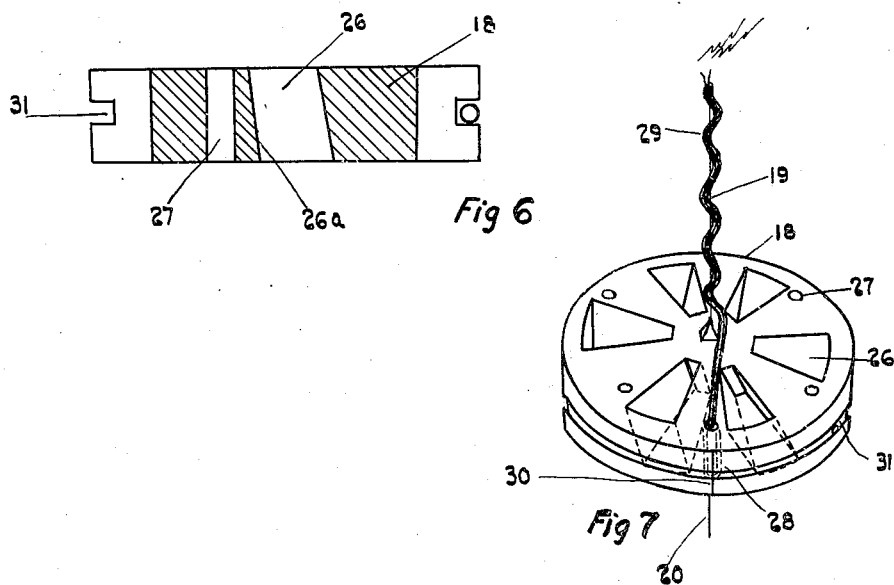

Patented Sept. 27, 1949

2,483,190

UNITED STATES PATENT OFFICE 2,483,190

FLOW METER

John Rockfield Evans, Westmount, Quebec, Canada

Application August 6, 1945, Serial No. 609,068

2 Claims. (Cl. 73—228)

The invention relates to flow meters as described in the present specification and illustrated in the accompanying drawings that form a part of the same.

The invention consists essentially of the novel features of construction as pointed out broadly and specifically in the claims for novelty following a description containing an explanation in detail of acceptable forms of the invention.

The objects of the invention are to devise a flow meter that will accurately measure the volume of fluid such as air, gas, steam and the like, as well as the volume of any liquid; to construct a flow meter that will be very sensitive at low rates of flow; to simplify the structure of the meter having the minimum of parts with no bearing parts or surfaces in contact and consequently avoid any possibility of the moving parts sticking; to enable the easy adjustability of the flow meter in accordance with the sensitivity; to minimize the trapping of air in the meter; and generally to provide a flow meter that will be durable in construction, positive in action, and efficient for its purpose.

In the drawings:

Figure 4 is a plan view of the disk.

Figure 5 is a cross sectional view of the disk as taken on the lines 5—5 in Figure 4.

Figure 6 is a cross sectional view of the disk as taken on the lines 6—6 in Figure 4.

Figure 7 is a perspective view of the disk having an illuminating means applied thereto.

Like numerals of reference indicate corresponding parts in the various figures.

Figure 1:
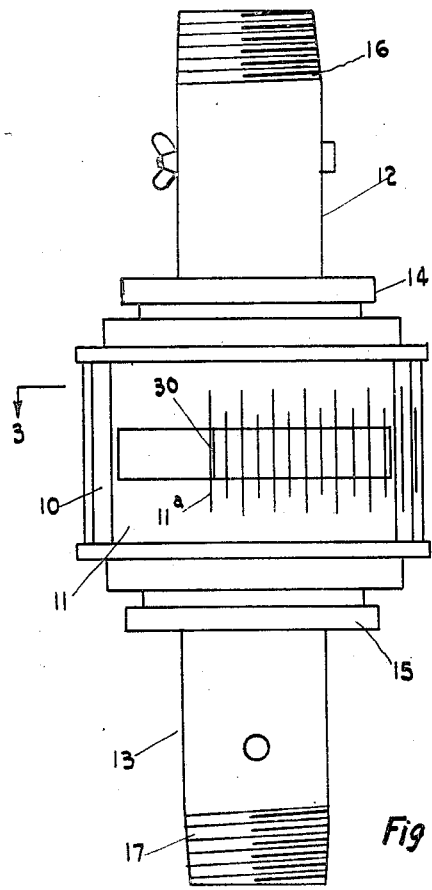
Figure 1 is a vertical elevation of the flow meter as installed.
Figure 2:
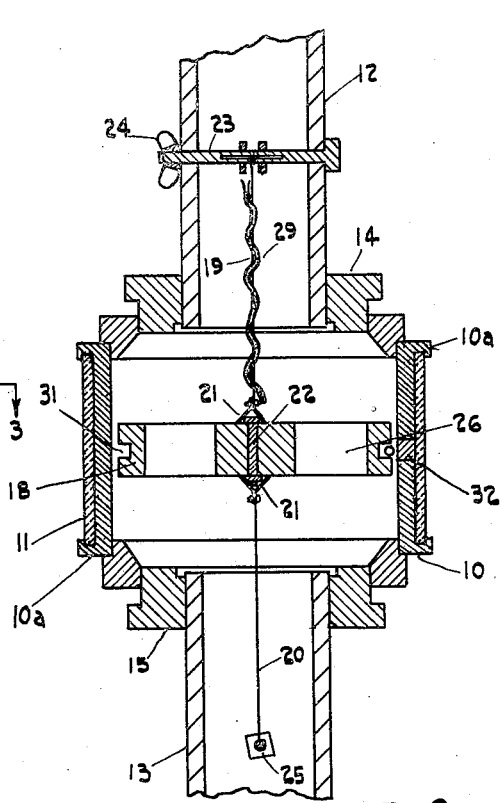
Figure 2 is a vertical sectional view of the flow meter.
Figure 3:
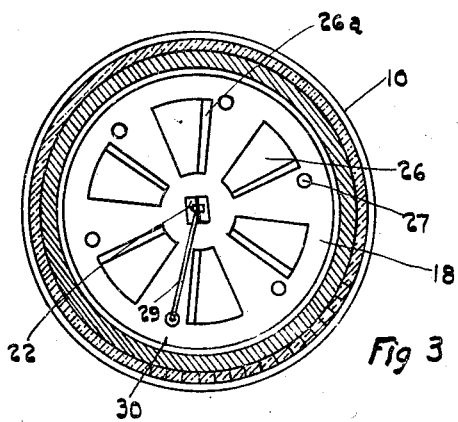
Figure 3 is a cross sectional view as taken on the lines 3—3 in Figure 1.

Referring to the drawings, the flow meter consists of a suitable metal casing, as indicated by the numeral 10, such as stainless steel. This casing has a channel portion 10a extending around the upper and lower edge thereof and a window portion of a suitable size is cut out of the casing between these channel portions. A transparent tube 11 encircles the casing 10 and the portion thereof which extends over the cutout in the casing has a scale 11a depicted thereon.

The casing 10 is provided with the usual couplings 14 and 15 and by which it is secured to the inlet and outlet connections 12 and 13.

Within the casing 10 is located a disk 18 made of suitable material, such as plastic, and the disk is provided with a plurality of slots 26 which extend radially from the central portion of the disk to adjacent of its circumference. These slots having sloping inner walls 26a. The disk is further provided with a plurality of apertures 27 and which are generally interspersed between the slots 26.

The disk 18 is centrally positioned in the casing and suspended in that location by tension springs. The means for suspending the disk by tension members may be varied in accordance with the best shop practice, but as illustrated, a tie member 22 is imbedded in the very centre of the disk and to which are secured one or more tension springs 19 and 20 which, in this instance serve as torsion springs. The upper spring member is connected to the adjustment member 23 being wrapped around same and, having the adjustment nut 24, while the lower spring and/or centering connection is suitably secured to a tie bolt 25 or other fastening means.

The adjacent suspension or tension members hold the disk in a rotation resisting position within the casing, while the adjustment means and tie bolt are transversely secured to the connecting members or what has been termed the inlet and outlet connections 12 and 13, the latter may be provided with threaded ends 16 and 17.

On the vertical portion of the circumference of the disk and at a suitable location is marked a hair line 30 which is adapted to coincide with a graduation on the scale in order to give the proper reading.

In the case where the fluid or liquid passing through the meter has a marking or dark colour or other propensities that will make it difficult to obtain a reading under normal conditions, illuminating means may be included, such as introducing an electric light bulb 28 inside the disk, preferably in alignment with the hair line 30, the light being connected to the source of power by means of the insulated wire 29. This disc 18 is made of transparent material, at all times regardless of whether the light 28 is used or not.

In the event that, during the use of the meter, the flow of the fluid or liquid will cause the disk to oscillate, making the reading of the scale difficult, it may be desirable to provide the disk with a channel portion 31 and in which is freely mounted a metal ball, subjected to magnetism, and providing the casing with a stationary magnetic block 32. In this way when the disk is subject to pressure due to the flow of the matter passing through the meter, the magnetic attraction between the magnet and the ball tends to balance the disc in its horizontal plane.

It will be noted from the above that the springs are regulated to be under sufficient tension to hold the disk in the specified position within the casing and to be under sufficient torsion to take up all lost motion in the system at any reading. When properly adjusted and the disk is in the exact centre of the casing, the springs are secured to the pipes in any suitable manner.

In brief, the meter is formed of a circular plastic disk, suspended as shown in the accompanying drawings by two springs, the disk and the springs are enclosed in a length of transparent pipe, so that the region of the plastic disk is visible from the outside. Sufficient clearance is provided between the disk and the walls of the pipe or other enclosure, so that the disk will be free from contact at all times with respect to its enclosure even after long periods of shut down.

The flow meter is preferably used in a vertical position at all times, therefore there is no problem of air release. The flow of fluid or liquid through the pipe 12 strikes the top surface of the plastic disk, exerting a torque, and going through the tapered slots rotates the disk, moving the hair line on the side around to give the reading on the scale. The small holes in the disk permit a portion of the fluid to pass therethrough thus reducing oscillation. When the flow ceases, the mutual action of the tension springs returns the hair line to the zero reading on the scale and holds it there until the flow commences again. The sensitivity may be adjusted by removing one of the bolts and twisting one spring, making the meter available to measure higher rates of flow with the same disk design and helping in the calibration.

What I claim is:

1. In flow meters, an annular casing having a cut-out portion in the wall thereof, a transparent tube encircling said casing and providing a window where the same extends over the cut-out in said casing, said casing having an outlet and an inlet, there being a measurement mark depicted on the portion of said transparent tube which forms a window over the cut-out in said casing, a rotatable member in said casing and perpendicular to the axis thereof having a measurement mark depicted thereon to coincide with the aforementioned measurement mark on said transparent tube to complete a flow reading, combination tension and torsion springs suspending said rotatable member, means for adjusting said combination tension and torsion springs, said rotatable member having a plurality of slots extending therethrough with sloping inner walls, said rotatable member being responsive to the flow of fluid therethrough as the same exerts pressure on the sloping inner walls of the slots in passing therethrough, and said tension and torsion springs positioning said rotatable member and also allowing said rotatable member to turn slightly from its neutral position due to pressure of the fluid passing therethrough.

2. In flow meters, an annular casing having a cut-out portion in the wall thereof, a transparent tube encircling said casing and providing a window where the same extends over the cut-out in said casing, said casing having an outlet and an inlet, there being a measurement mark depicted on the portion of said transparent tube which forms a window over the cut-out in said casing, a transparent disc within and perpendicular to the axis of said casing, torsion springs suspending said disc in tension, said disc having a plurality of slots with sloping inner walls extending therethrough, said disc having a plurality of apertures interspersed between the slots therein, said disc having a hair line depicted thereon and coinciding with the measurement mark on said transparent tube permitting a reading of the meter, and an illuminating means accommodated within said transparent disc in alignment with the hair line depicted thereon, a magnet located in the wall of said casing, there being an annular channel portion extending inward from the periphery of said disc, a metal ball freely mounted in said annular channel portion, and said metal ball being attracted to said magnet thereby tending to balance said disc as it is moved by the pressure of the flow of liquid therethrough.

JOHN ROCKFIELD EVANS.

REFERENCES CITED

The following references are of record in the file of this patent:

UNITED STATES PATENTS

| Number | Name | Date |
| --- | --- | --- |
| 1,278,902 | Foot | Sept. 17, 1918 |
| 1,955,754 | Lyon | Apr. 24, 1934 |
| 2,207,747 | Manarik et al. | July 16, 1940 |
| 2,315,185 | Boyle | Mar. 30, 1943 |
| 2,316,255 | Knobel et al. | Apr. 13, 1943 |
| 2,422,762 | Williams | June 24, 1947 |

FOREIGN PATENTS

| Number | Country | Date |
| --- | --- | --- |
| 17,985 | France | Oct. 13, 1913 |
| 76,568 | Austria | May 26, 1919 |
| 602,146 | France | Dec. 18, 1925 |
| 736,188 | France | Sept. 12, 1932 |